Dec. 17, 1946.     A. RURAK     2,412,783
CHISEL
Filed Oct. 25, 1944
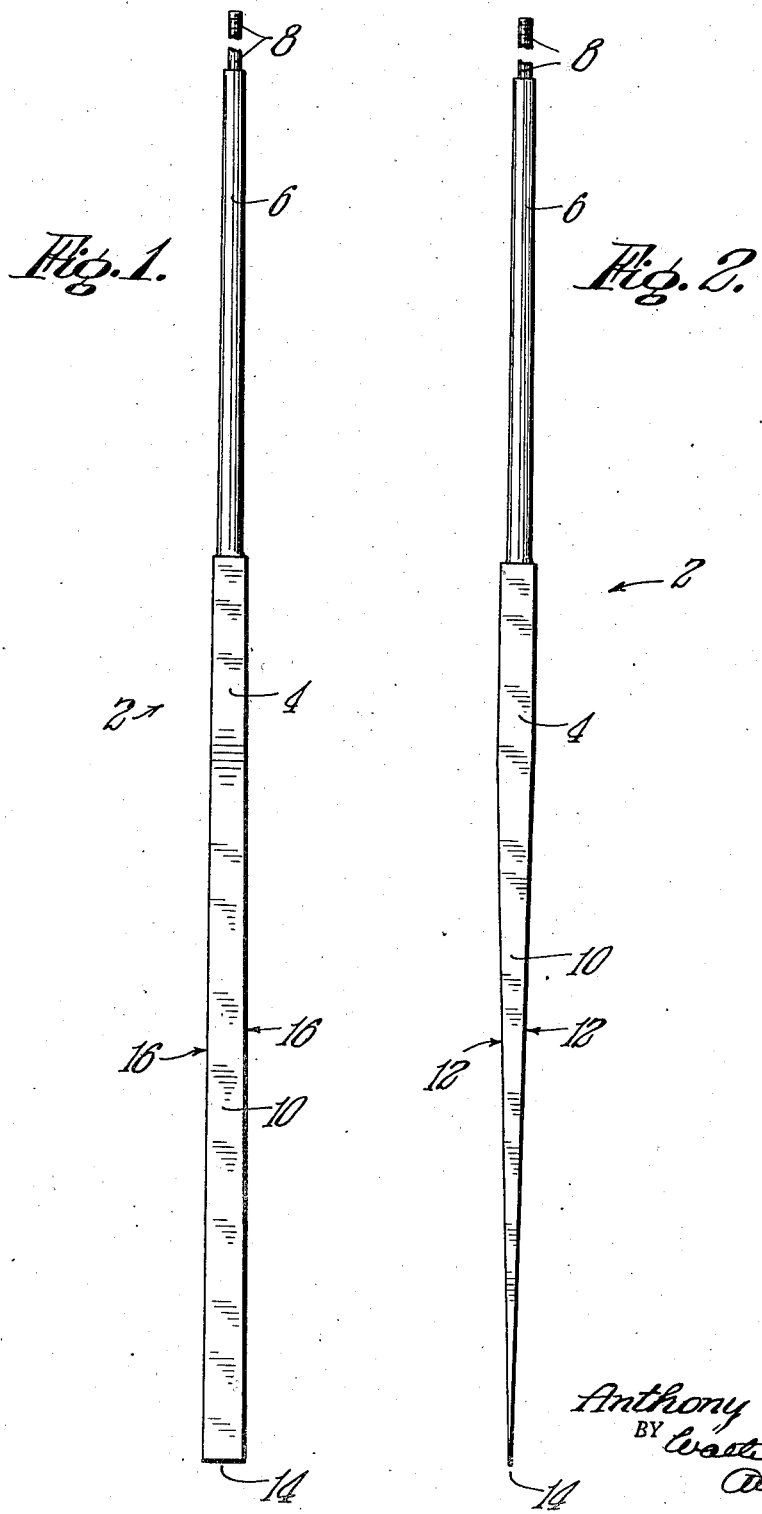
INVENTOR.
Anthony Rurak.
BY Walter C. Ross
Attorney.

Patented Dec. 17, 1946

2,412,783

UNITED STATES PATENT OFFICE 2,412,783

CHISEL

Anthony Rurak, Springfield, Mass.

Application October 25, 1944, Serial No. 560,319

1 Claim. (Cl. 262—33)

This invention relates to improvements in chisels and is directed more particularly to improvements in sportsman's chisels.

The principal objects of the invention are directed to the provision of a chisel which is particularly adapted for the use of sportsmen or fishermen in forming holes in ice for ice fishing.

A hole for fishing through the ice should be smooth and clean cut and only large enough to accommodate the fishing apparatus. It is not possible with heretofore known chisels to provide the proper kind of a hole particularly where the ice is of appreciable thickness, the hole is usually too large and rough in shape.

According to this invention, a chisel is provided which by reason of its novel construction is adapted for cutting holes through ice of many inches in thickness which holes are smooth and of the desired shape. Due to the characteristics of the chisel the cutting action thereof is readily controlled so that holes of the desired shape and size may be formed.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawing wherein:

Figs. 1 and 2 are front and side elevational views respectively of a chisel embodying the novel features of the invention.

Referring now to the drawing more in detail, the novel features of the invention will be fully described.

The chisel 2 of the invention will preferably be made from a suitable grade or type of steel and has an intermediate body portion 4 which is substantially rectangular in cross section and of considerable strength.

Upwardly of the body portion 4 there extends a shank portion 6 which is preferably round in cross section and tapering, as shown.

On the upper end of the shank portion 6 there is a stem or tang portion 8 which is adapted for insertion in a handle, not shown. Said handle will be such as to withstand blows struck thereonto and impart the same to the shank portion.

A lower cutting portion 10 extends downwardly from the body portion 4 which has converging faces 12, as in Fig. 2, which terminate in a sharp lower cutting edge 14.

The sides 16 of the cutting portion, as shown in Fig. 1 diverge to provide a gradually widening shape so that the cutting edge 14 is relatively wider than the upper portion of the cutting part 10.

When blows are applied to the upper end of the chisel the cutting edge sinks rapidly into the ice so that the chisel is fast cutting and the particular form provides a smooth clean hole.

It will be noted that blows are delivered to the body portion through the shank 8. The body portion considered by itself is of considerable bulk and weight and reinforces the chisel intermediate its ends.

By providing the body portion, shank and chisel in the arrangement shown it is possible to form a chisel of considerable length for cutting through ice of considerable thickness which is not possible where a rod with a sharpened lower end is used.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

As a new article of manufacture, a unitary sportsman's chisel construction for cutting holes in ice comprising in combination, a single length of metal formed to have an intermediate elongated parallel sided body portion substantially rectangular in cross section, a cylindrical upwardly tapering shank extending upwardly from said body portion which is of less diameter than said body portion and having a stem on the upper end thereof, a cutting portion extending downwardly from said body portion provided with front and rear faces continuing downwardly from front and rear faces of the body portion and converging relation to a lower sharp straight continuous cutting edge and having opposite side edges between the said front and rear faces extending downwardly from corresponding faces of the body portion in a diverging relation to provide said cutting edge with a transverse width which is greater than that of said faces of the body portion.

ANTHONY RURAK.